(12) United States Patent
Le (10) Patent No.: US 7,204,668 B2
(45) Date of Patent: Apr. 17, 2007

(54) PANEL FASTENER WITH SPRING RETAINING RING

(75) Inventor: Tam Le, Canoga Park, CA (US)

(73) Assignee: Avibank Mfg., Inc., North Hollywood, CA (US)

( * ) Notice: Subject to any disclaimer, the term of this patent is extended or adjusted under 35 U.S.C. 154(b) by 0 days.

(21) Appl. No.: 11/087,537

(22) Filed: Mar. 23, 2005

(65) Prior Publication Data

US 2006/0216132 A1    Sep. 28, 2006

(51) Int. Cl.
*F16B 21/18* (2006.01)
(52) U.S. Cl. ...................................................... 411/353
(58) Field of Classification Search ................ 411/353, 411/522, 530, 516, 517, 526
See application file for complete search history.

(56) References Cited

U.S. PATENT DOCUMENTS

| | | | | |
|---|---|---|---|---|
| 40,714 A | * | 11/1863 | St. John ........................ 24/106 |
| 73,735 A | * | 1/1868 | Magrane ....................... 24/106 |
| 1,039,531 A | * | 9/1912 | Hartley ........................ 256/54 |
| 1,232,528 A | * | 7/1917 | Gemill ......................... 29/270 |
| 1,269,411 A | * | 6/1918 | Edwards .................... 242/597.4 |
| 1,389,754 A | * | 9/1921 | Hale ............................ 40/120 |
| 1,397,101 A | * | 11/1921 | Kelly .......................... 292/327 |
| 1,497,806 A | * | 6/1924 | Stenman ...................... 24/676 |
| 1,659,094 A | * | 2/1928 | Godfrey ....................... 403/252 |
| 1,758,203 A | * | 5/1930 | Segal ........................... 70/131 |
| 1,758,515 A | * | 5/1930 | Heiermann .................... 403/155 |
| 1,840,704 A | * | 1/1932 | Dawson ........................ 251/337 |
| 1,873,270 A | * | 8/1932 | Blazer .......................... 24/108 |
| 1,948,676 A | * | 2/1934 | Riek ........................ 137/543.21 |
| 1,949,027 A | * | 2/1934 | Pancoe ......................... 24/672 |
| 1,973,971 A | * | 9/1934 | West ............................ 292/76 |
| RE19,452 E | * | 2/1935 | Peterson ...................... 411/530 |
| 2,026,585 A | * | 1/1936 | Marshall ...................... 112/417 |
| 2,037,301 A | * | 4/1936 | Ball ............................ 24/626 |
| 2,129,420 A | * | 9/1938 | Guy ........................... 411/516 |
| 2,301,786 A | * | 11/1942 | Millermaster ................. 174/51 |
| 2,385,565 A | * | 9/1945 | Cox ............................ 24/665 |
| 2,388,841 A | * | 11/1945 | Goodwin ...................... 285/276 |
| 2,411,761 A | * | 11/1946 | Stolberg ...................... 411/517 |
| 2,457,472 A | * | 12/1948 | Hufferd et al. ............... 251/318 |
| 2,485,189 A | * | 10/1949 | Churchill ...................... 292/80 |
| 2,522,991 A | * | 9/1950 | Caserta ........................ 403/261 |
| 2,530,083 A | * | 11/1950 | Ruch .......................... 411/530 |
| 2,803,416 A | * | 8/1957 | Berlien ........................ 248/544 |
| 2,815,789 A | * | 12/1957 | Hutson et al. ................. 411/111 |

(Continued)

OTHER PUBLICATIONS http://www.engineersedge.com/spring_general.htm.*

*Primary Examiner*—Robert J. Sandy
*Assistant Examiner*—Jeffrey A. Sharp
(74) *Attorney, Agent, or Firm*—Greenberg Traurig, LLP (57) ABSTRACT

A fastener assembly having a bolt having a shaft and a nose portion at its terminal end. A ring is mounted on the bolt. The ring is an elongated piece of resilient material curving from a first end about the bolt shaft, then curving back around to a second end adjacent the first end parallel thereto but spaced therefrom. In this manner the ring resiliently grips the bolt shaft and is adapted to hold the bolt in a hold out position when it is mounted in aligned openings in abutting panels.

11 Claims, 8 Drawing Sheets

U.S. PATENT DOCUMENTS

| | | | |
|---|---|---|---|
| 2,845,291 A * | 7/1958 | Priestman | 403/14 |
| 2,886,355 A * | 5/1959 | Wurzel | 403/326 |
| 2,902,303 A * | 9/1959 | Davis | 403/344 |
| 2,925,802 A * | 2/1960 | White, Jr. | 403/18 |
| 2,926,033 A * | 2/1960 | Zarrillo | 403/326 |
| 2,991,816 A * | 7/1961 | Harbison et al. | 411/111 |
| 3,093,179 A * | 6/1963 | Zahodiakin et al. | 411/353 |
| 3,137,336 A * | 6/1964 | Wing | 411/135 |
| 3,141,487 A * | 7/1964 | Boyd | 411/105 |
| 3,180,388 A * | 4/1965 | Newcomer, Jr. et al. | 411/353 |
| 3,217,774 A * | 11/1965 | Pelochino | 411/353 |
| 3,221,847 A * | 12/1965 | Attwood | 403/408.1 |
| 3,232,088 A * | 2/1966 | Newcomer, Jr. et al. | 72/377 |
| 3,270,124 A * | 8/1966 | Rawls et al. | 174/144 |
| 3,289,726 A * | 12/1966 | Sauter | 411/105 |
| 3,386,671 A * | 6/1968 | Turner | 241/46.015 |
| 3,397,727 A * | 8/1968 | Orosz | 411/105 |
| 3,442,171 A * | 5/1969 | Engelmann | 411/520 |
| 3,583,461 A * | 6/1971 | Klaus | 411/105 |
| 3,595,123 A * | 7/1971 | Wurzel | 411/517 |
| 3,753,582 A * | 8/1973 | Graham | 285/305 |
| 3,820,199 A * | 6/1974 | Popper et al. | 411/352 |
| 3,826,024 A * | 7/1974 | Petersen | 37/458 |
| 3,995,675 A * | 12/1976 | Cosenza | 411/353 |
| 4,099,444 A * | 7/1978 | Millheiser et al. | 411/517 |
| 4,324,517 A * | 4/1982 | Dey | 411/353 |
| 4,367,602 A * | 1/1983 | Petersen | 37/459 |
| 4,464,090 A * | 8/1984 | Duran | 411/103 |
| 4,505,058 A * | 3/1985 | Peterson | 37/459 |
| 4,594,040 A * | 6/1986 | Molina | 411/353 |
| 4,616,967 A * | 10/1986 | Molina | 411/105 |
| 4,733,987 A * | 3/1988 | Tomlinson et al. | 403/326 |
| 4,735,536 A * | 4/1988 | Duran | 411/353 |
| 4,828,442 A * | 5/1989 | Duran | 411/353 |
| 4,886,408 A * | 12/1989 | Killian et al. | 411/519 |
| 4,909,370 A * | 3/1990 | Limbacher et al. | 192/98 |
| 4,911,726 A * | 3/1990 | Warkentin | 81/124.2 |
| 4,934,888 A * | 6/1990 | Corsmeier et al. | 411/353 |
| 4,948,316 A * | 8/1990 | Duran et al. | 411/353 |
| 4,952,093 A * | 8/1990 | Murakami | 403/261 |
| 5,076,747 A * | 12/1991 | Cosenza | 411/353 |
| 5,085,548 A * | 2/1992 | Moyles | 411/316 |
| 5,219,256 A * | 6/1993 | Ford et al. | 411/530 |
| 5,399,053 A * | 3/1995 | Duran | 411/353 |
| 5,704,100 A * | 1/1998 | Swan | 24/656 |
| 5,855,052 A * | 1/1999 | Becker et al. | 29/464 |
| 6,082,943 A * | 7/2000 | Schneider | 411/517 |
| 6,854,944 B2 * | 2/2005 | Hoffmann et al. | 411/433 |

* cited by examiner

PANEL FASTENER WITH SPRING RETAINING RING

BACKGROUND OF THE INVENTION

1. Field of the Invention

The invention relates to panel fasteners; and, more particularly, to a captive panel fastener having a spring retaining ring retaining the fastener in a hold out position in a panel.

2. Related Art

Captive panel fasteners are well known in the aircraft art. For example, in U.S. Pat. No. 3,995,675 to Cosenza, there is described a captive panel fastener assembly wherein a retaining ring with inwardly extending tabs slidably ride along the body of a stud, the tabs entering splines extending lengthwise of the stud. A knurled plug is press-fit into a bore at the nose of the stud after insertion of the stud through a hole in a panel and after placement of the ring on the stud. This retains the ring to the stud and allows a more rigid and closely fitting retaining ring to be used as a captivating means of the stud to the panel. The retaining ring is more resistant to accidental displacement than more flexible retaining rings.

In U.S. Pat. No. 4,828,442, there is disclosed a captive panel fastener assembly having an integral hold out spring and built-in stop ring provided on a threaded bolt. The bolt is adapted to be inserted through a hole in a panel. The hold out spring and built-in stop ring are inserted into a bore in the bolt, the hold out spring portion extending out of a slot in the bolt and the built-in stop ring portion enters a groove adjacent the nose of the bolt. In one embodiment of the invention, a washer having inwardly extending tabs is installed on the shank of the bolt prior to insertion of the built-in stop ring portion, the tabs riding in grooves extending along the outer body of the bolt and stopped in their downward movement by engagement with the built-in stop ring portion.

In U.S. Pat. No. 5,399,053, there is disclosed is a fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The body of the bolt includes a plurality of spaced grooves extending longitudinally along the outer surface of the bolt body. A retainer surrounds the bolt body having spaced ears riding in the grooves and a stop in a groove adjacent the nose of the bolt stops the downward movement of the retainer. A cup member surrounds the retainer thereby protecting the retainer during its movement along the grooves. A similar arrangement is disclosed in U.S. Pat. No. 4,948,316. All of the foregoing patents require a stop on the shaft of the bolt to prevent the retainer from exiting off the bolt shaft.

In U.S. Pat. No. 4,911,726 to Warkentin, there is disclosed an elongated fastener engagable with a retaining ring to secure the fastener to a panel. The fastener includes a first set of uniformly-spaced splines extending along its external surface and terminating at an end of the fastener opposite an enlarged head. A second set of longitudinal splines is interleaved with the first set, these second splines being closed at their opposite ends. A separate crossover slot connects together each associated pair of open-end and closed-end splines. A retainer ring having inwardly-projecting tabs is slid onto the fastener with its tabs engaging the first set of open-end splines and the retaining ring is thereafter rotated to slide the tabs across the crossover slots to the closed-end splines. The depth of the crossover slots is less than the depth of the closed-end splines, such that the retaining ring must expand or flex outwardly when the tabs are slid across the slots. A special insertion tool is used to secure the retaining ring in place and has a general cylindrical shape and an opening in one end for receiving the fastener. The end of the tool is notched to engage the retaining ring tabs, and the tool wall is sufficiently thin to fit between the fastener and the retaining ring.

Although this patent eliminates the need for a stop on the shaft of the bolt, a special insertion tool is needed to secure the retaining ring in place. Further, the bolt must be carefully machined to provide the appropriate crossover slots.

In U.S. Pat. No. 2,815,789 to Hutson et al, there is disclosed a nut retainer which is known as the Milson panel fastener. This fastener uses a spring-like ring on the bolt body which resiliently grips the body of the bolt to hold the bolt in a hold out position with respect to the panel in which it is installed when the ring is held to the panel. However, the Milson-type ring does not have the required strength and does not adapt itself to angular movements of the bolt. Although other solutions have been proposed over the years, as discussed above, they are generally more expensive than the Milson-type ring but heretofore no one has been able to solve the problems inherent in the Milson-type ring.

There is a need for a panel fastener having a retaining ring adapted to be slidably mounted thereon which resiliently holds the bolt to a panel or the like. Such a fastener should not require a special tool to assemble the ring to the fastener nor require careful machining of the ring or the bolt body and retain its resiliency during repeated usage. It should also readily compensate for angular adjustments of the body.

SUMMARY OF THE INVENTION

It is an object of this invention to provide a spring fastener retaining ring assembly adapted to be secured to an aircraft panel or the like without need for special assembly tools.

It is a further object of this invention to provide such an assembly having a bolt receiving a resilient retaining ring which bolt does not require careful machining of the same.

It is still further an object of this invention to provide an improved resilient ring for use with a bolt that resiliency grips the body of the bolt and holds the same in a hold out position with respect to a panel.

These and other objects of the invention are preferably accomplished by providing a fastener assembly having a bolt having a shaft and a nose portion at its terminal end. A spring retaining ring is mounted on the shaft of the bolt. The ring is an elongated piece of resilient material curving from a first end about the bolt shaft, then curving back around to a second end adjacent the first end parallel thereto but spaced therefrom. In this manner, the ring resiliently grips the bolt shaft and holds the bolt in a hold out position.

DETAILED DESCRIPTION OF THE PREFERRED EMBODIMENTS

Figures 1, 2, 3:
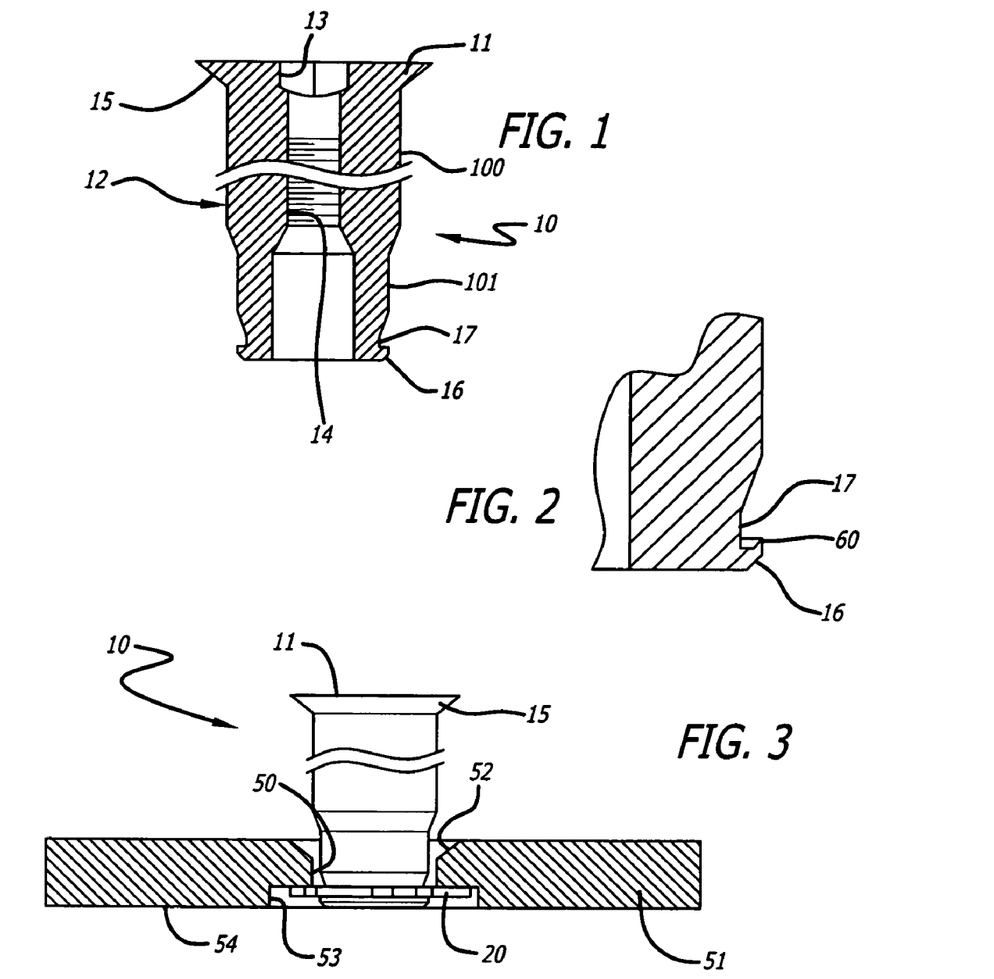
FIG. 1 is an elevational perspective view of a bolt in accordance with the teachings of the invention.
FIG. 2 is a detailed view of a portion of the bolt of FIG. 1.
FIG. 3 is an elevational view of the bolt of FIG. 1 with a retainer ring mounted thereon installed in an opening in a panel.

Referring now to FIG. 1 of the drawing, a bolt 10 is shown having an enlarged head 11 at one end and an elongated integral shaft 12. Bolt 10 has an upper outer diameter 100 and a lower outer diameter 101 of lesser diameter than upper outer diameter 100. Head 11 may have a hex socket 13 for engagement by a suitable tool and shaft 12 may be threaded its interior 14 for threadably receiving a threaded stud (not shown in FIG. 1) therein. Head 11 may be tapered on its undersurface, as at taper 15.

Figure 11:
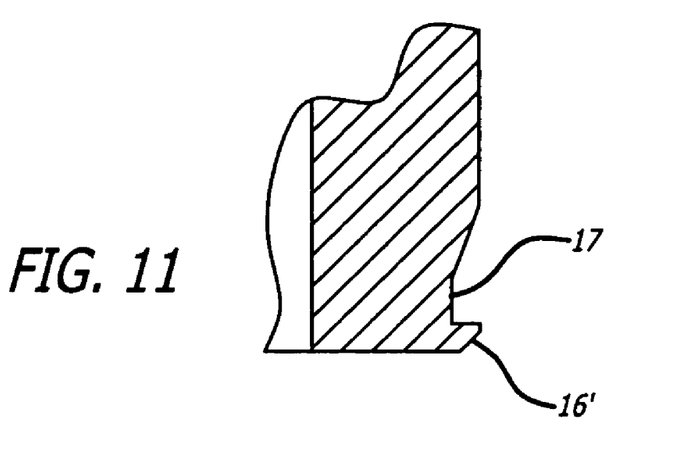
FIG. 11 is a detailed view of a modification of the nose of the bolt of FIGS. 1 and 2.

The lower end of shaft 12 may terminate in a nose portion 16 with a reduced diameter section 17 on the exterior of shaft 12 between nose portion 16 and the remainder of shaft 12 (see also FIG. 2). Nose portion 16 can have two different options as shown in the embodiment of FIG. 11; this will be discussed further hereinbelow.

Figure 4:
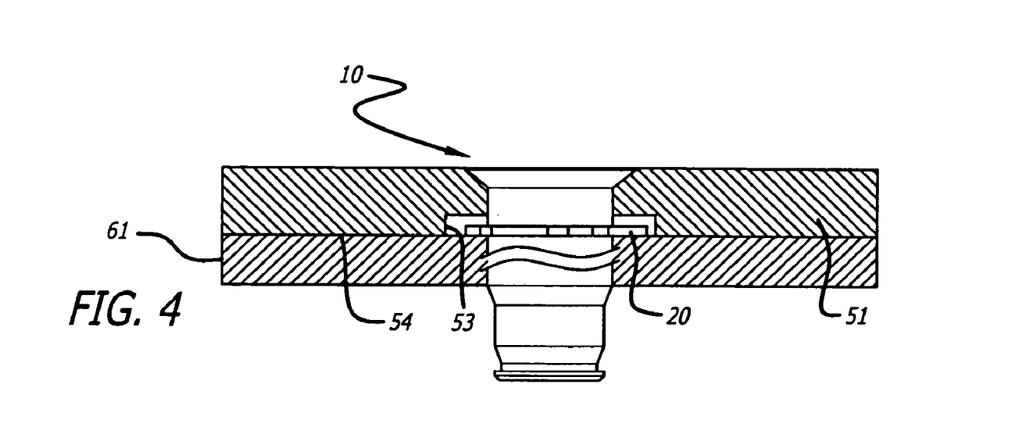
FIG. 4 is an elevational view similar to FIG. 3 showing another position of the bolt in the opening in the panel.

Bolt 10 is adapted to be inserted through an opening 50 in a panel 51 (FIG. 3). A countersunk portion 52 leads into opening 50 and a generally circular cavity 53 is formed on the underside of panel 51 communicating with opening 50. Taper 15 of head 11 of bolt 10 is adapted to engage countersunk portion 52 when the bolt 10 is pushed downwardly to the FIG. 4 position, as will be discussed. In the aircraft industry, this is considered a countersunk or flush head fastener. Other head styles may be used based on the application. An abutting panel 61 is shown abutting against panel 51.

A spring retaining ring 20, as will also be discussed, is mounted on bolt 10 disposed in cavity 53.

Figure 5:
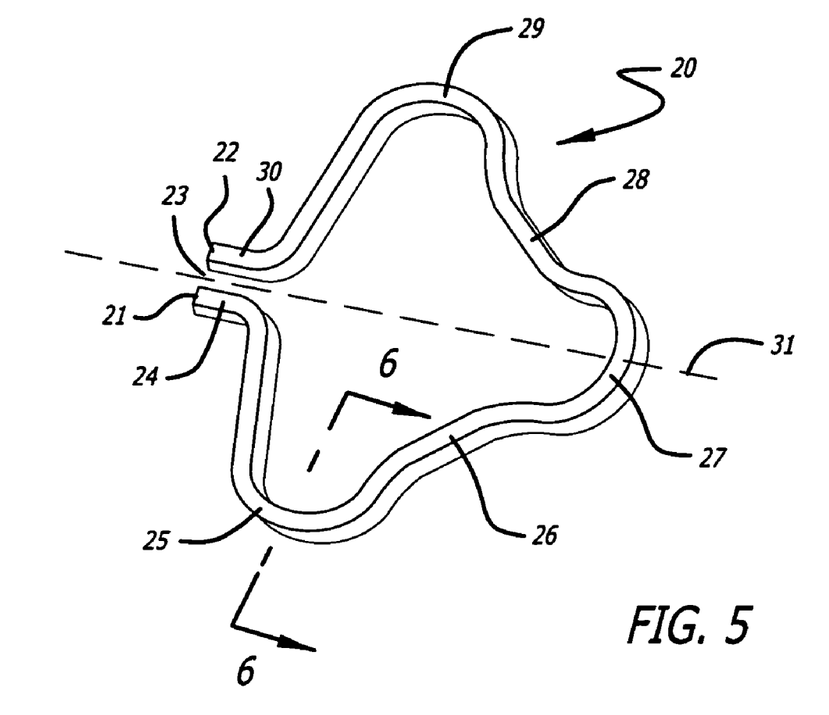
FIG. 5 is a perspective view of the spring retainer ring alone of FIGS. 3 and 4.

As seen in FIG. 5, the retaining ring 20 is shown in plan view. Ring 20 is a split ring comprised of a single length of wire or the like beginning at one end 21 and terminating at another end 22, aligned with end 21 and forming a gap 23 therebetween.

End 21 thus extends first in a linearly direction forming a first straight portion 24, then curves outwardly away from portion 24 forming a first generally U-shaped arched portion 25 integral with portion 24. Arched portion 25 then curves back inwardly, forming a first integral generally elongated portion 26, then curves to a second integral generally U-shaped arched portion 27.

Portion 27 then extends to a second integral generally elongated portion 28 which extends to a third integral generally U-shaped arched portion 29 opposite first arched portion 25. Arched portion 29 extends back to, and is integral with, a second portion 30, parallel to first straight portion 24, and spaced therefrom. It can be seen in FIG. 5 that an imaginary line 31 extending through generally the midpoint of portion 27 and the center of the spacing 23 between ends 24, 30 divides ring 20 into 2 parts, one part being the mirror image of the other.

Figures 6, 7:
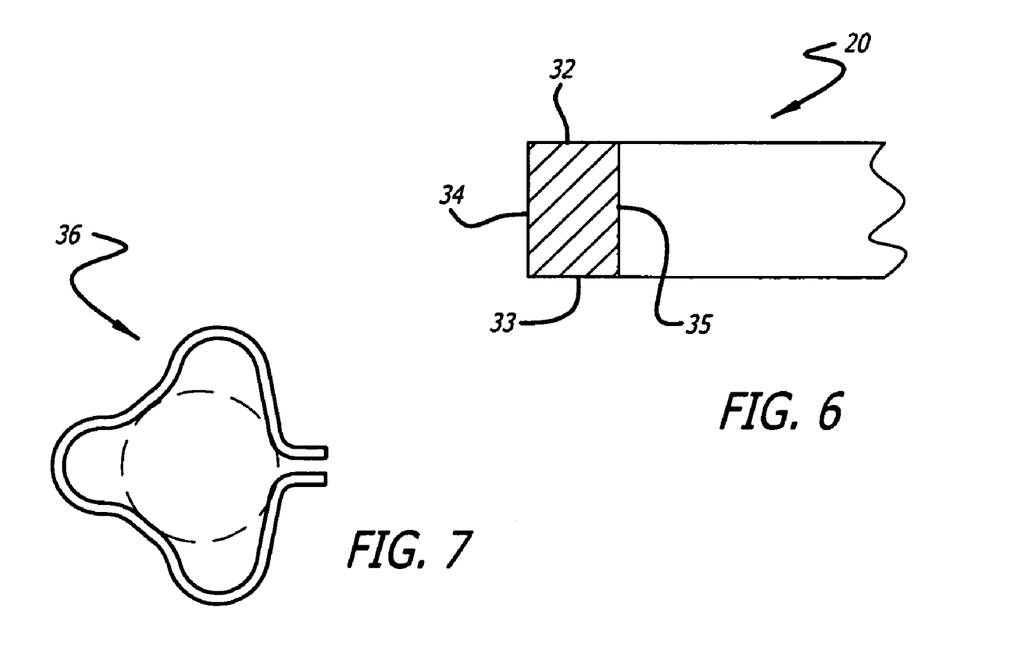
FIG. 6 is a cross-sectional view of a portion of the ring of FIG. 5 taken along lines 6—6 thereof.
FIG. 7 is a plan view of a ring in accordance with the invention.
Figure 12:
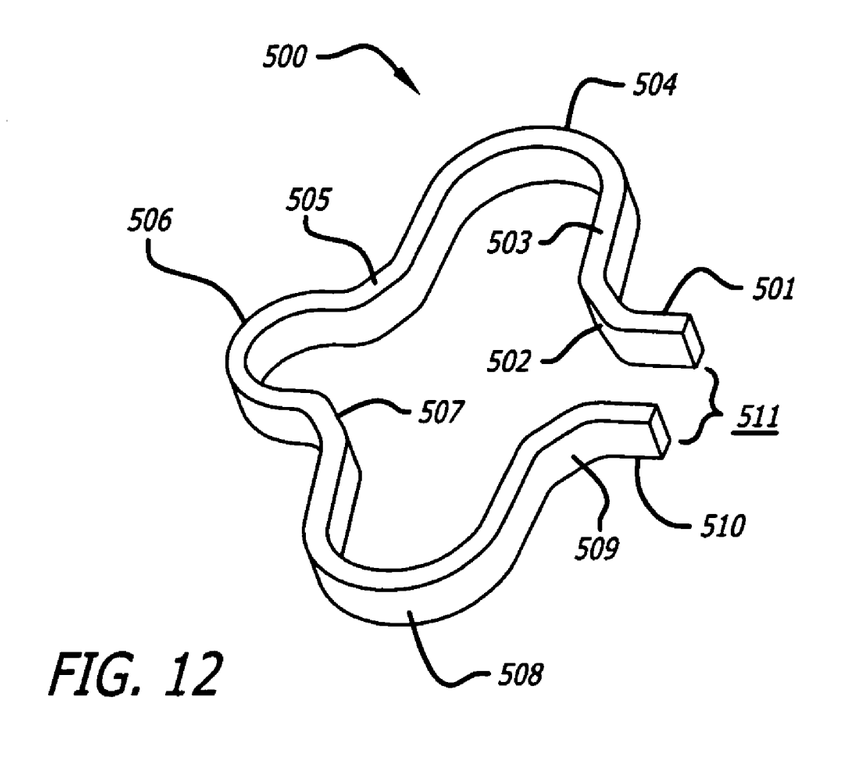
FIG. 12 is a perspective view of a second embodiment of a ring in accordance with the teachings of the invention.

Although any suitable dimensions may be used, as seen in FIG. 6, ring 20 is generally rectangular in cross section having a generally flat upper surface 32 spaced from a generally flat lower surface 33 with a generally flat outer peripheral surface 34 spaced from a generally flat inner peripheral surface 35. As previously discussed, any suitable dimensions may be used. Two such rings 36, 37 and 500 are shown in FIGS. 7 and 12. Any suitable materials may be used that offer a modulus of elasticity above 27,000,000 psi.

In assembly of the ring 20 to the bolt 10, the bolt is pushed through opening 50 in panel 51 and the ring 20 is installed thereon in any suitable manner (FIG. 3). Of course, rings 36 and 500 would be assembled in like manner depending on the diameter of the bolt shaft 12.

In any event, spring ring 20 is pushed over nose portion 16 into reduced area 17. The annular lip 60 or rolled edge of the embodiment of FIGS. 1 and 2 provides an outer edge to the nose portion 16 also serving to retain the ring 20 in position. It improves the load carrying capability of rings 36 and 500. Thus, as seen by comparing FIGS. 3 and 4, the bolt 10 can move up and down with respect to ring 20.

When the second panel 61 (FIG. 8) is disposed against the underside 54 of panel 51, the opening 62 in panel 61 is aligned with opening 50 in panel 51. However, spring ring 20 has a diameter greater than openings 50, 62 so that it is trapped between panels 51, 61 allowing bolt 10 to move from a hold out position (FIG. 8) to the position installed in opening 50 as seen in FIG. 9.

A receptacle assembly 120 comprised of a receptacle bracket 130 (see also FIG. 10), a barrel 140 and an externally threaded stud 150 is mounted to the underside 63 of panel 61. As seen in FIG. 9, the lower end 160 of barrel 140 is crimped about the base 180 of stud 150 to engage the stud 150 and connect the barrel 140 thereto. The stud 150 has protrusions 200 extending outwardly on both sides thereof adapted to enter slotted openings 201 in barrel 140. Barrel 140 has spaced slots 201 configured similarly to protrusion 200. This is an anti-rotation feature preventing stud 150 from rotating within barrel 140 thereby allowing the stud 150 and barrel 140 to mate and lock and act as one unitary element. Barrel 140 also includes tabs or ears 190 (FIG. 10) which are inserted into a pair of slots 210, formed in basket 130, thereby connecting the barrel 140 to basket 130. Slots 210 are circumferentially greater in length than the width of tabs or ears 190 thereby permitting the barrel 140 and stud 150 to rotate to a limited degree with respect to basket 130. Basket 130 is secured to substructure or sub-panel 61 (FIG. 9) by any suitable means, such as rivets 212 (FIG. 9). Although receptacle assembly 120 and basket 130 have been described as an assembly of individual components, obviously a single element may be used.

Receptacle assembly 120 is secured to the underside 63 of sub-panel 61 by riveting basket 130 to sub-panel 211 using rivets 212 passing through holes 440 (FIG. 10) in basket 130 and into sub-panel 61. The barrel 140 and stud 150 are secured thereto as heretofore described. Any suitable thread lock as is known in the art may be used, such as a plastic insert installed through the side of barrel 140 or protrusions on the threads of the bolt.

In summary, bolt 10 is slipped into hole 50 in panel 51. The ring 20 is installed over the nose end 16 of bolt 10. Bolt 10 can freely move back and forth in hole 50 (FIG. 3) but the ring 20 is captive in the groove 17 of bolt 10. Bolt 10 is prevented from falling out of hole 50 in panel 51 by ring 20.

Figure 8:
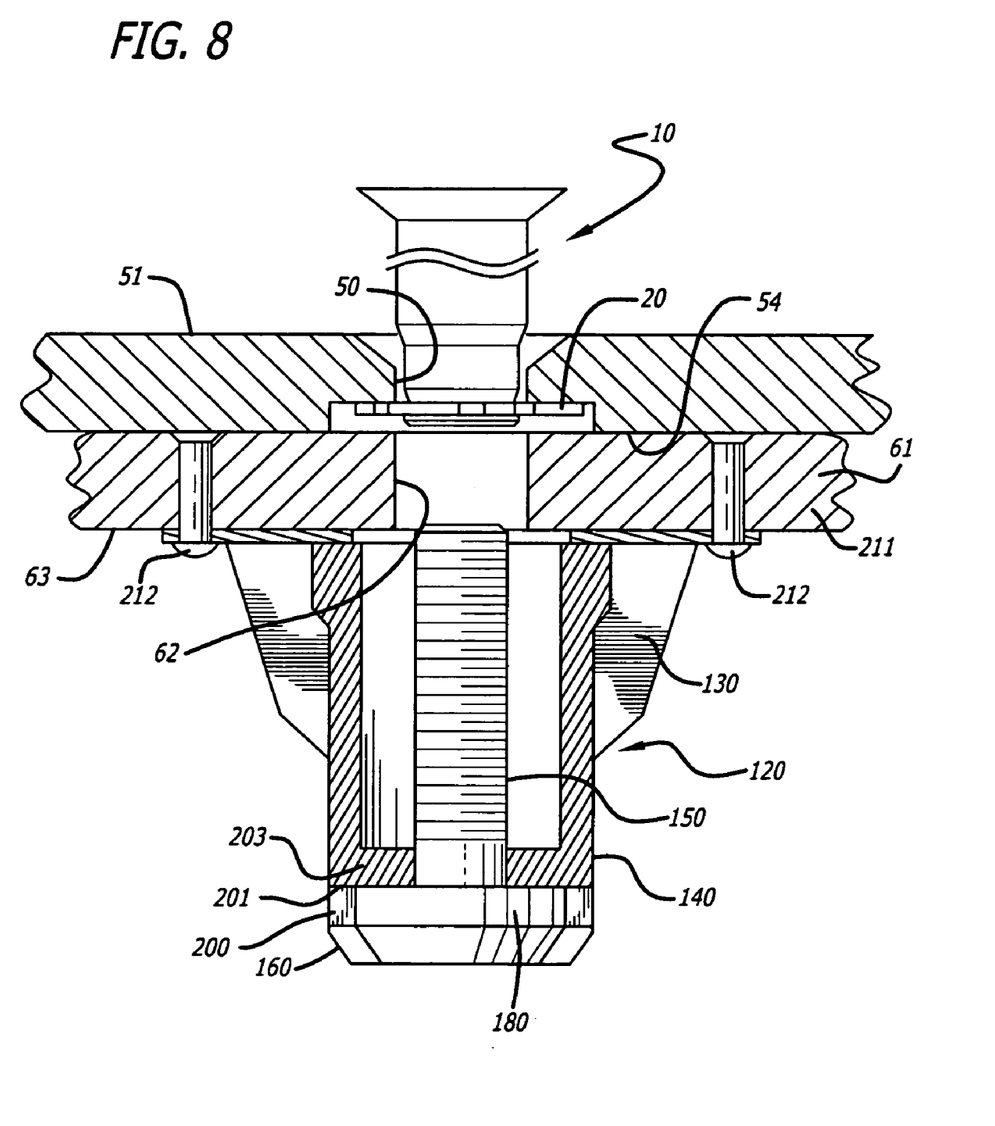
FIG. 8 is an elevated view, partly in section, of the bolt and ring of FIGS. 3 and 4 with a second installation panel in abutting position and showing a receptacle assembly panel.
Figure 9:
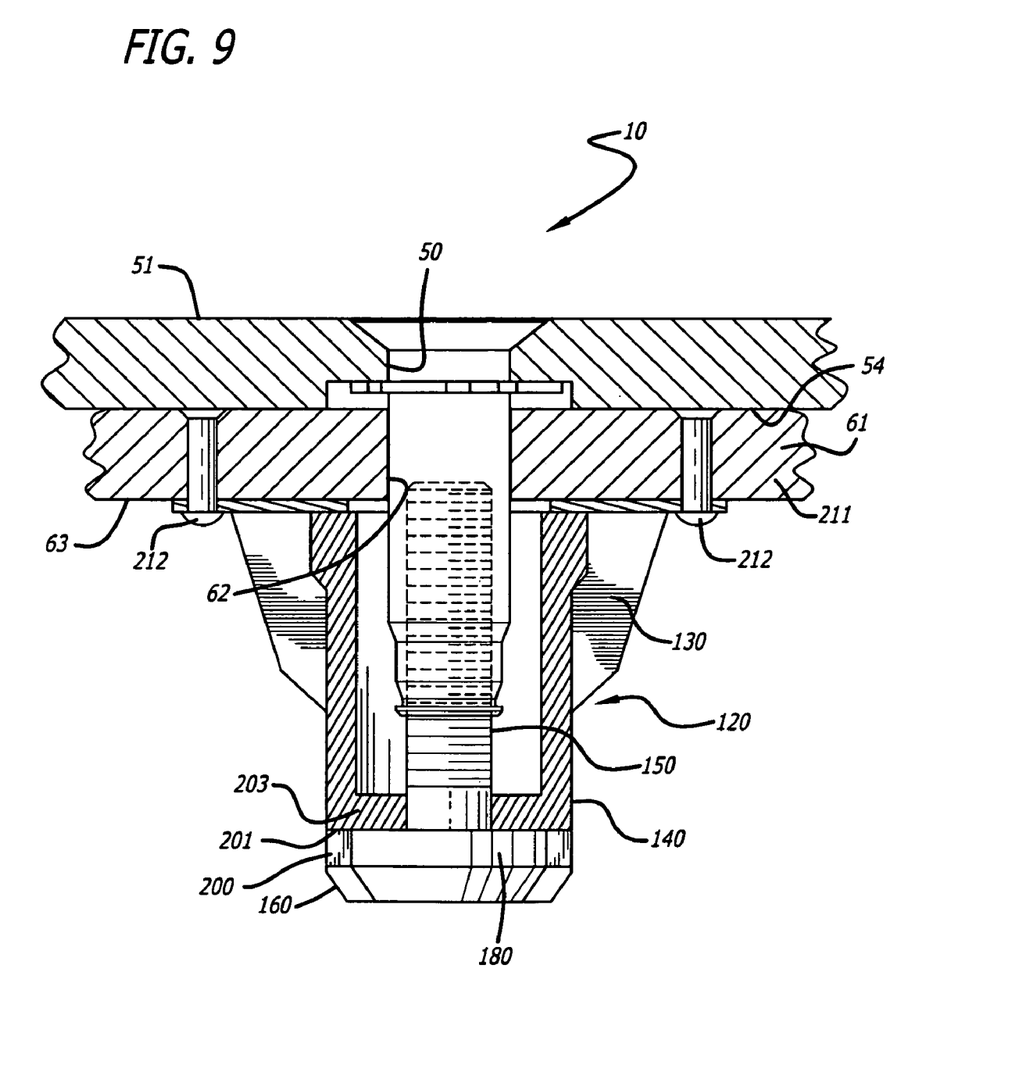
FIG. 9 is a view similar to FIG. 8 showing the bolt threaded to the shaft of the receptacle assembly.
Figure 10:
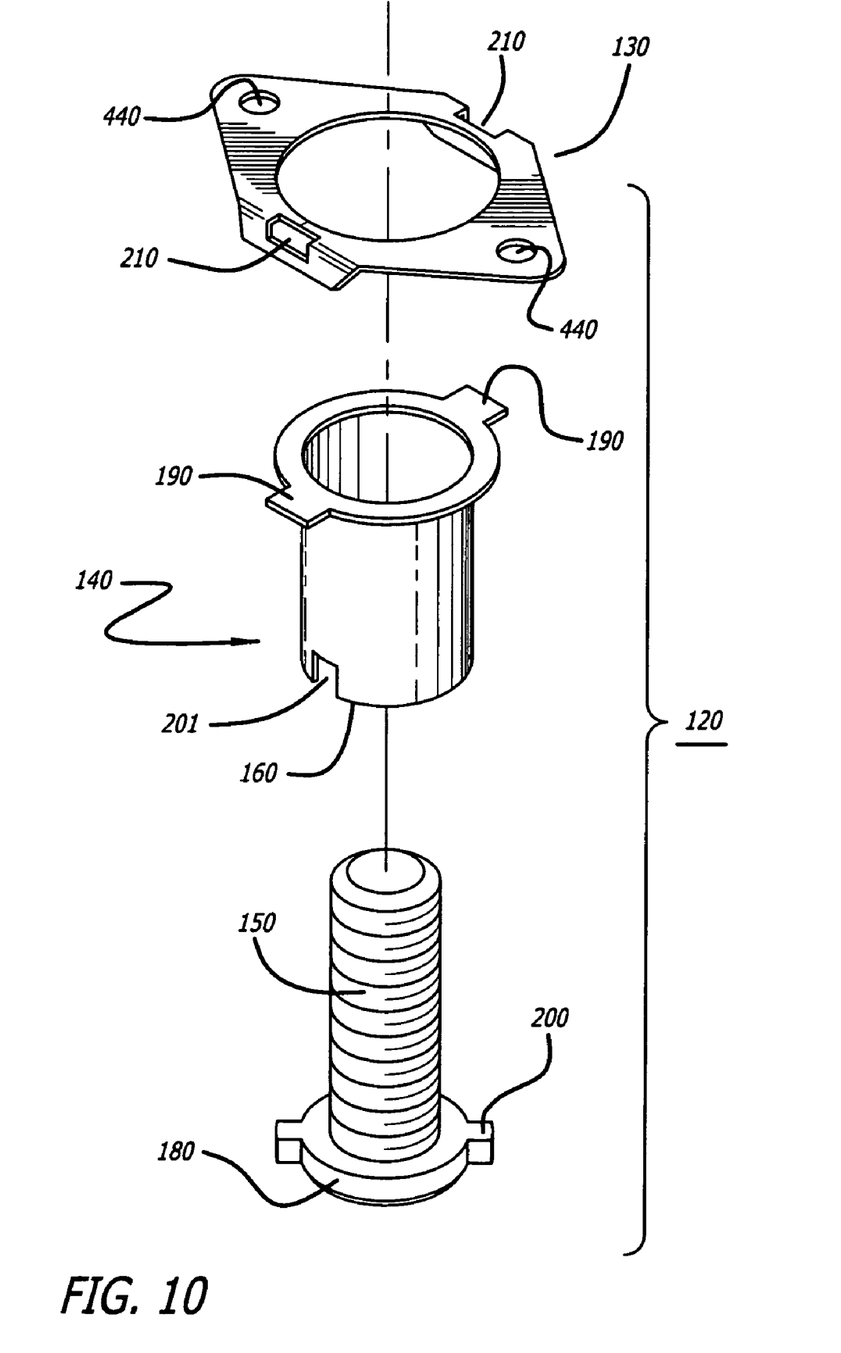
FIG. 10 is an exploded view of the receptacle assembly alone of FIGS. 8 and 9.

As seen in FIG. 8, panel 51, with bolt 10 in place, is disposed against the installation or structure subpanel and 61. As seen in FIG. 10, a receptacle assembly 120 is mounted to the underside 63 of subpanel and 61. Bolt 10, is rotated by using a suitable installation tool (not shown) in socket 13, (e.g., hex.). The bolt 10 can now be threaded to receptacle assembly 120. That is, threaded shaft 150 enters threaded socket 14 in bolt 10 and threads thereto. As bolt 10 is threaded, ring 20 is forced to slide up the outside of bolt 10 onto the larger diameter upper portion 100 which causes ring 20 to expand. As the bolt 10 is unscrewed from engagement with shaft 150, panel 51 can be lifted off with bolt 10 still attached as seen in FIG. 3.

FIG. 11 shows an alternative nose 16' wherein like numerals refer to like parts of FIGS. 1 and 2, wherein the rolled edge 60 in FIG. 2 is eliminated. An alternative ring 500 is shown in FIG. 12. Ring 500 has a first straight portion 501 extending to an angled portion 502. Angled portion 502 extends a second straight portion curving to form a first curved portion 504. Curved portion 504 extends to a straight portion 505 curving about second curved portion 506. Portion 506 extends to a straight portion 507 connected to a curved portion 508, diametrically opposite curved portion 504. Curved portion 508 is integral with an angled portion 509 integral with straight portion 510 spaced from straight portion 501 and forming a gap 511 therebetween.

Figure 13:
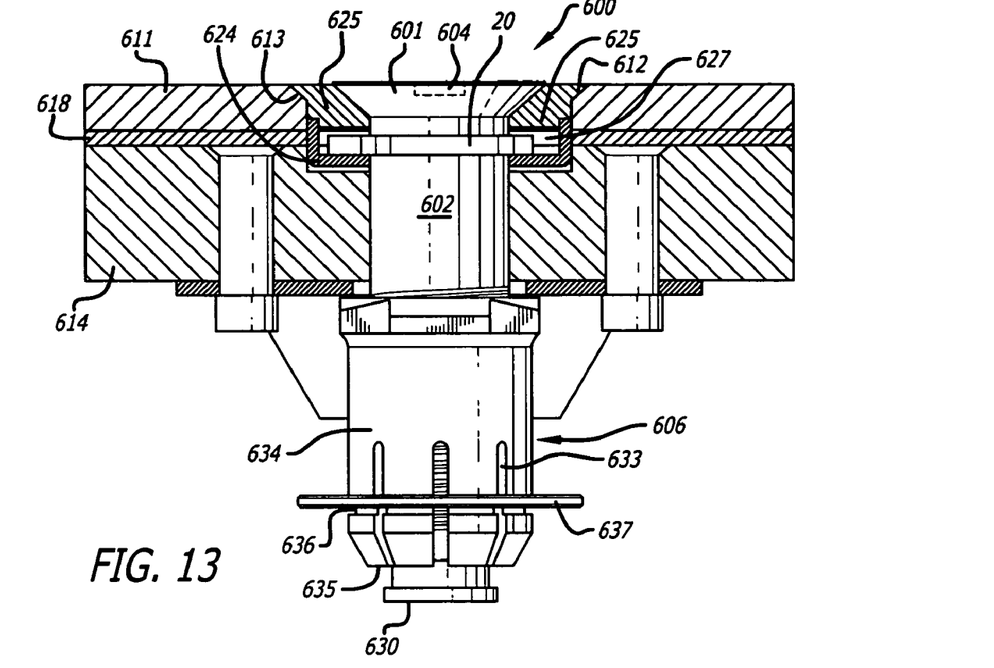
FIG. 13 is a vertical view, partly in section, of a bolt and nut assembly in accordance with the teachings of the invention wherein the bolt is externally threaded.
Figure 14:
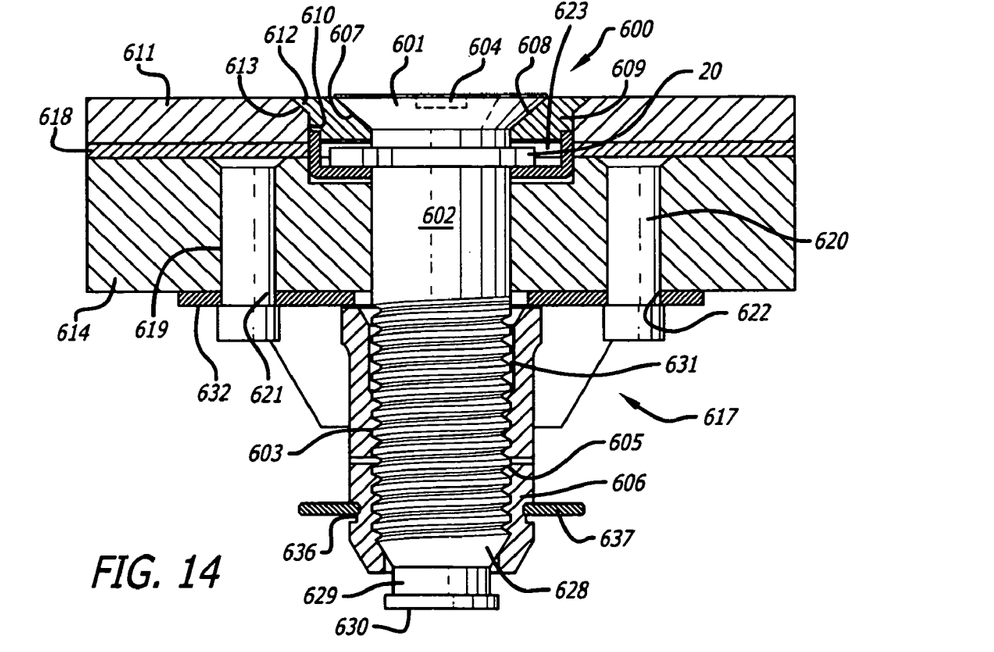
FIG. 14 is a cross-sectional view of the bolt and nut of FIG. 13.

Although bolt 10 is shown as internally threaded in the embodiment of FIGS. 1 to 12, as seen in FIGS. 13 and 14, the bolt may be externally threaded.

Thus, bolt 600 (FIG. 13) is shown having an enlarged head 601 at one end and an integral elongated shaft 602. Bolt 600 has an integral outwardly threaded portion 603 (FIG. 14) and may have a hex shaped socket 604, shown in dotted lines, in head 601 for engagement by a suitable tool. Threaded portion 603 threads into an internally threaded socket 605 in threaded nut 606. Head 601 may be tapered on its undersurface 607 to engage and counter sink into the tapered opening 608 of a grommet 609 mounted in a hole 610 in panel 611. Grommet 609 may have an outer tapered flange or lip 612 which is countersunk into a like configured area 613 leading into hole 610.

Nut 606 is secured to the bottom panel 614 by a receptacle assembly which includes a nut 606 and basket 617 similar to the barrel 140 and basket 130 of FIG. 10. A gasket 618 may be disposed between panels 611, 614 and spaced rivets 619, 620 mounted in holes 621, 622, as discussed with respect to FIGS. 9 and 10.

Figure 15:
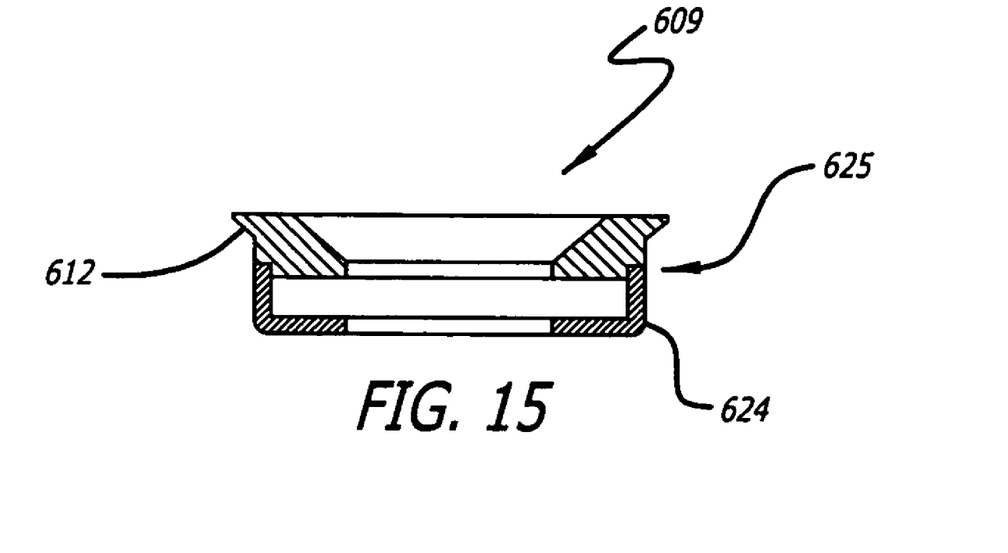
FIG. 15 is an elevational view of the grommet alone of the assembly of FIGS. 13 and 14.

As seen in FIG. 15, grommet 609 has a lower cap 624 and the upper main body portion 625, which terminates at its upper end in the lip 612 which is countersunk into area 613 (FIGS. 13 and 14).

Ring 20, as heretofore discussed, is mounted on bolt 600 and is disposed within groove 623.

The threaded portion 603 of bolt 602 terminates at its lower end in a tapered section 628 leading to a cylindrical section 629 and then to a terminal flanged end or nose 630 wider in diameter than section 629.

Bolt 602 extends through the cylindrical portion 631 of basket 617, nut 606 having spaced ears (not shown—similar to ears 190 in FIG. 10) entering slots (also not shown, but similar to slots 210 in FIG. 10) in the flange portion 632 of basket 617.

As seen in FIG. 13, a plurality of elongated slots 633 are provided along the outer surface 634 of nut 606 extending from a point generally at the middle of nut 606 to the terminal end 635 thereof to provide for expansion thereof. An annular groove 636 is provided on the outer surface 634 of nut 606 between the terminal end 635 and the upper ends of slots 633. A resilient ring 637 is disposed in groove 636 in nut or stud 606.

Figure 16:
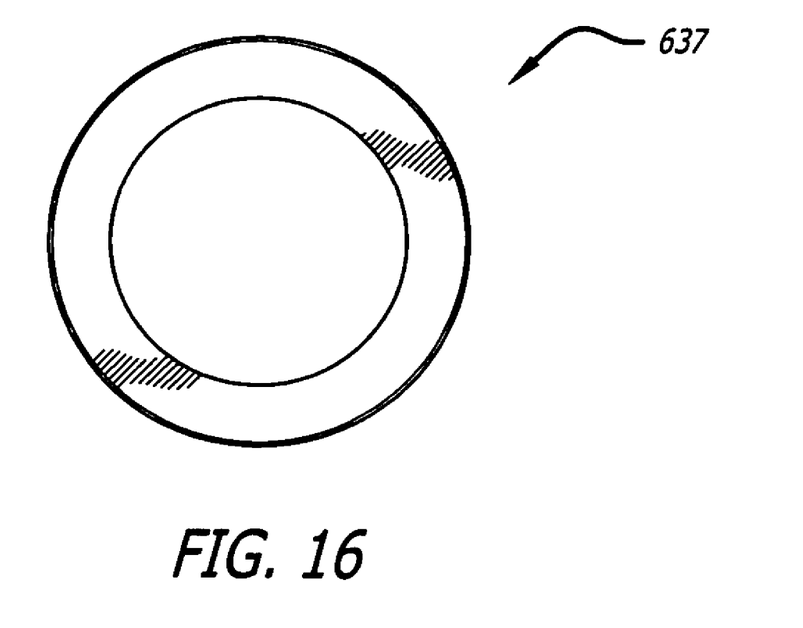
FIG. 16 is a perspective view of a retaining ring alone of the assembly of FIGS. 13 and 14.

That is, a resilient ring 637 (FIG. 16) is mounted over the lower end of nut 606 until it snaps into groove 636.

Thus, ring 20, as heretofore discussed, will trap bolt 602 as discussed above with respect to FIGS. 3 and 4. Nose 630 may be similar to nose 61 and 16' in FIGS. 2 and 11.

There is thus disclosed an improved spring ring for holding bolt 10 in a hold out position with respect to the panel. Any suitable materials and dimensions may be used. The bolts may be threaded internally or on the exterior.

Although a particular embodiment of the invention is disclosed, variations thereof may occur to an artisan and the scope of the invention should only be limited by the scope of the appended claims.

I claim:

1. A spring retainer ring adapted to be mounted in the groove of a bolt comprising a split ring formed of one continuous piece of resilient material having a central longitudinal axis and consisting only of a first end having a first generally straight portion parallel with the longitudinal axis of said ring extending in a linearly direction and then curving to a first linear portion, then curving to a first generally U-shaped arched portion on the outer surface of said ring, then curving to a second linear portion, then curving to a second generally U-shaped arched portion on the outer surface of said ring, then curving to a third linear portion, then curving to a third generally U-shaped arched portion on the outer surface of said ring, then curving to a fourth linear portion, then curving to a second generally straight portion parallel with the longitudinal axis of said ring that terminates at a second end spaced from said first end, said first and second straight portions being generally parallel to each other and spaced therefrom, said first and second linear portions and said third and fourth linear portions having inner surfaces abutting against said shaft of said bolt and resiliently gripping the same at four contact points so as to hold said bolt in a hold out position with respect to said panel, said ring being made of a material having a modulus of elasticity exceeding 27,000,000 psi, said ring also being rectangular in cross section having a generally flat upper surface spaced from a generally flat lower surface, and having a generally flat first side wall spaced from a generally flat second side wall, the spacing between said upper and lower surfaces being greater than the spacing between said side walls.

2. In a fastener assembly for joining a panel to a sub-panel comprising a receptacle assembly having a threaded stud secured to the undersurface of the sub-panel, a bolt having an enlarged head at one end, an integral shaft and a nose at the other end, said nose being adapted to extend through a countersunk opening in said panel coaxially aligned with an opening through said sub-panel, said stud being coaxially aligned with said opening through said sub-panel, said bolt being threaded for threaded engagement to said stud, the improvement which comprises a spring retainer ring having an outer surface and an inner surface mounted on said shaft, said ring being a split ring formed of one continuous piece of resilient material having a central longitudinal axis and consisting only of a first end having a first generally straight portion parallel with the longitudinal axis of said ring extending in a linearly direction and then curving to a first linear portion, then curving to a first generally U-shaped arched portion on the outer surface of said ring, then curving to a second linear portion, then curving to a second generally U-shaped arched portion on the outer surface of said ring, then curving to a third linear portion, then curving to a third generally U-shaped arched portion on the outer surface of said ring, then curving to a fourth linear portion, then curving to a second generally straight portion parallel with the longitudinal axis of said ring that terminates at a second end spaced from said first end, said first and second straight portions being generally parallel to each other and spaced therefrom, said first and second linear portions and said third and fourth linear portions having inner surfaces abutting against said shaft of said bolt and resiliently gripping the same at four contact points so as to hold said bolt in a hold out position with respect to said panel, said ring being made of a material having a modulus of elasticity exceeding 27,000,000 psi, said ring also being rectangular in cross section having a generally flat upper surface spaced from a generally flat lower surface, and a generally flat first side wall spaced from a generally flat second side wall, the spacing between said upper and lower surfaces being greater than the spacing between said side walls.

3. In the assembly of claim 1, said panel having an upper surface and a lower surface, said lower surface being disposed adjacent said sub-panel and having a cavity therein wider than the widest diameter of said ring, said ring being normally disposed in said cavity when said panel and said sub-panel are in abutting relationship.

4. In the assembly of claim 1 wherein said nose terminates in an outwardly extending annular flange, and a groove adjacent said nose disposed between said flange and said head.

5. In the assembly of claim 4 wherein said flange has a generally flat upper surface.

6. In the assembly of claim 4 wherein said flange terminates at its outer extremity in an upwardly extending lip.

7. A fastener assembly for joining a panel to a sub-panel comprising:
a receptacle assembly having a threaded stud secured to the undersurface of a sub-panel;
a bolt having an enlarged head at one end and a nose at the other end, said nose being adapted to extend through a countersink opening in said panel coaxially aligned with both of said openings, a groove provided in said bolt between said nose and said head, said bolt being threaded for threaded engagement to said stud;
a spring retainer ring mounted in said groove, said ring being a split ring formed of one continuous piece of resilient material having a central longitudinal axis and consisting only of a first end having a first generally straight portion parallel with the longitudinal axis of said ring extending in a linearly direction and then curving to a first linear portion, then curving to a first generally U-shaped arched portion on the outer surface of said ring, then curving to a second linear portion, then curving to a second generally U-shaped arched portion on the outer surface of said ring, then curving to a third linear portion, then curving to a third generally U-shaped arched portion on the outer surface of said ring, then curving to a fourth linear portion, then curving to a second generally straight portion parallel with the longitudinal axis of said ring that terminates at a second end spaced from said first end, said first and second straight portions being generally parallel to each other and spaced therefrom, said first and second linear portions and said third and fourth linear portions having inner surfaces abutting against said shaft of said bolt and resiliently gripping the same at four contact points so as to hold said bolt in a hold out position with respect to said panel, said ring being made of a material having a modulus of elasticity exceeding 27,000,000 psi, said ring also being rectangular in cross section having a generally flat upper surface spaced from a generally flat lower surface, and having a generally flat first side wall spaced from a generally flat second side wall, the spacing between said upper and lower surfaces being greater than the spacing between said side walls.

8. The assembly of claim 7, wherein said panel has an upper surface and a lower surface, said lower surface being disposed adjacent said sub-panel and having a cavity therein wider than the widest diameter of said ring, said ring being normally disposed in said cavity when said panel and said sub-panel are in abutting relationship.

9. In a fastener assembly for joining a panel to a sub-panel comprising a receptacle assembly having an internally threaded stud secured to the undersurface of the sub-panel, a bolt having an enlarged head at one end an integral shaft and a nose at the other end, said nose being adapted to extend through a countersunk opening in said panel coaxially aligned with both of said bolt being externally threaded for threaded engagement to said stud, the improvement which comprises a spring retainer ring having an outer surface and an inner surface mounted on the shaft of said bolt, said ring being a split ring formed of one continuous piece of resilient material having a central longitudinal axis and consisting only of a first end having a first generally straight portion parallel with the longitudinal axis of said ring extending in a linearly direction and then curving to a first linear portion, then curving to a first generally U-shaped arched portion on the outer surface of said ring, then curving to a second linear portion, then curving to a second generally U-shaped arched portion on the outer surface of said ring, then curving to a third linear portion, then curving to a third generally U-shaped arched portion on the outer surface of said ring, then curving to a fourth linear portion, then curving to a second generally straight portion parallel with the longitudinal axis of said ring that terminates at a second end spaced from said first end, said first and second straight portions being generally parallel to each other and spaced therefrom, said first and second linear portions and said third and fourth linear portions having inner surfaces abutting against said shaft of said bolt and resiliently gripping the same at four contact points so as to hold said bolt in a hold out position with respect to said panel, said ring being made of a material having a modulus of elasticity exceeding 27,000,000 psi, said ring also being rectangular in cross section having a generally flat upper surface spaced from a generally flat lower surface, and having a generally flat first side wall spaced from a generally flat second side wall, the spacing between said upper and lower surfaces being greater than the spacing between said side walls.

10. In the assembly of claim 9, said panel having an upper surface and a lower surface, said lower surface being disposed adjacent said sub-panel and having a cavity therein wider than the widest diameter of said ring, said ring being normally disposed in said cavity when said panel and said sub-panel are in abutting relationship.

11. In a fastener assembly for joining a panel to a sub-panel comprising a receptacle assembly having a threaded stud secured to the undersurface of the sub-panel, a bolt having an enlarged head at one end, an integral shaft and a nose at the other end, said nose being adapted to extend through a countersunk opening in said panel coaxially aligned with an opening through said sub-panel, said stud being coaxially aligned with said opening through said sub-panel, said bolt being threaded for threaded engagement to said stud, the improvement which comprises a spring retainer ring mounted on said shaft, said ring being a split ring formed of one continuous piece of resilient material having a central longitudinal axis and having an inner and an outer surface and consisting only of a first end having a first generally straight portion parallel with the longitudinal axis of said ring extending in a linearly direction and then curving to a first linear portion, then curving to a first generally U-shaped arched portion on the outer surface of said ring, then curving to a second linear portion, then curving to a second generally U-shaped arched portion on the outer surface of said ring, then curving to a third linear portion, then curving to a third generally U-shaped arched portion on the outer surface of said ring, then curving to a fourth linear portion, then curving to a second generally straight portion parallel with the longitudinal axis of said ring that terminates at a second end spaced from said first end, said first and second straight portions being generally parallel to each other and spaced therefrom, said first and second linear portions and said third and fourth linear portions having inner surfaces abutting against said shaft of said bolt and resiliently gripping the same at four contact points so as to hold said bolt in a hold out position with respect to said panel, said ring being made of a material having a modulus of elasticity exceeding 27,000,000 psi, said ring also being rectangular in cross section having a generally flat upper surface spaced from a generally flat first said wall spaced from a generally flat second side wall, the spacing between said upper and lower surfaces being greater than the spacing between said side walls.

* * * * *